(12) United States Patent
Kawabata

(10) Patent No.: US 7,775,490 B2
(45) Date of Patent: Aug. 17, 2010

(54) SUCTION CUP AND FABRICATION METHOD THEREFOR

(75) Inventor: Makoto Kawabata, Tokyo (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/042,796

(22) Filed: Mar. 5, 2008

(65) Prior Publication Data

US 2008/0230661 A1    Sep. 25, 2008

(30) Foreign Application Priority Data

Mar. 19, 2007    (JP) .............................. 2007-071289

(51) Int. Cl.
    *A47F 5/08* (2006.01)
(52) U.S. Cl. .................................. 248/205.5
(58) Field of Classification Search ............. 248/205.5, 248/205.7, 206.2, 363, 362, 205.8; 264/250, 264/328.1
    See application file for complete search history.

(56) References Cited

U.S. PATENT DOCUMENTS 6,425,565 B1 * 7/2002 Montague ................... 248/363

| | | | |
|---|---|---|---|
| 2007/0023594 A1 | 2/2007 | Choi et al. | |
| 2007/0102847 A1 | 5/2007 | Ilda et al. | |
| 2007/0246621 A1 | 10/2007 | Akai et al. | |
| 2008/0251664 A1 * | 10/2008 | Hara et al. | 248/205.8 |
| 2010/0044539 A1 * | 2/2010 | Ilda et al. | 248/206.2 |

FOREIGN PATENT DOCUMENTS

| | | |
|---|---|---|
| JP | 2006-509987 | 3/2006 |
| JP | 2006-308025 | 11/2006 |
| JP | 2006-347138 | 12/2006 |

* cited by examiner

*Primary Examiner*—Ramon O Ramirez
(74) *Attorney, Agent, or Firm*—Oblon, Spivak, McClelland, Maier & Neustadt, L.L.P.

(57) ABSTRACT

A suction cup, includes: a suction cup body made of a synthetic resin material having elasticity; and a gel layer bonded to the suction cup body and having a surface serving as a suction face; the suction cup body being made of thermoplastic polyurethane elastomer, the gel layer being made of two-pack thermosetting polyurethane gel, the suction cup body and the gel layer being bonded to each other by bonding of an isocyanate group which the thermoplastic polyurethane elastomer has and a hydroxyl group which the two-pack thermosetting polyurethane gel has.

4 Claims, 2 Drawing Sheets

SUCTION CUP AND FABRICATION METHOD THEREFOR

CROSS REFERENCES TO RELATED APPLICATIONS

The present invention contains subject matter related to Japanese Patent Application JP 2007-071289 filed with the Japan Patent Office on Mar. 19, 2007, the entire contents of which being incorporated herein by reference.

BACKGROUND OF THE INVENTION

1. Field of the Invention

This embodiment relates to a suction cup having a suction face formed from a gel layer and a fabrication method for the suction cup.

2. Description of the Related Art

A suction cup in related art is made of a single resilient material such as a synthetic resin material having elasticity. Therefore, the existing suction cup is disadvantageous in that it is not suitably used to attach a vehicle-carried apparatus such as a display unit of a car navigation system or a television apparatus to the surface of a dashboard which is formed as a leather-embossed face or a rough face. Therefore, the assignee of the present application proposed a suction cup suitably used to attach a vehicle-carried apparatus such as a display unit of a car navigation system or a television apparatus with certainty to a dashboard even if the surface of the dashboard is formed as a leather-emboss surface or a rough surface. A suction cap of the type described is disclosed in Japanese Patent Laid-Open No. 2006-347138. The suction cup includes a suction cup body made of a synthetic resin material having elasticity and a gel layer made of gel and bonded to the suction cup body. The surface of the gel layer serves as a suction face. According to the suction cup, a vehicle-carried apparatus can be removably attached with certainty to the surface of a dashboard which is formed as a leather-emboss face or a rough face. Also another suction cup has been proposed which includes a suction cup body made of a synthetic resin material having elasticity and a viscous layer or adhesive layer bonded to the suction cup body as disclosed in Japanese Patent Laid-Open No. 2006-308025. However, although the suction cup can fix a handrail to a wall with certainty, it cannot removably attach a handrail.

SUMMARY OF THE INVENTION

The assignee of this embodiment has enthusiastically studied a suction cup which includes a suction cup body made of a synthetic resin material having elasticity and a gel layer made of gel and bonded to the suction cup body. As a result of the study, the following facts have been found out. Where plastic styrene-based elastomer is used for the suction cup body, the suction cup body is liable to suffer from change in shape. Such change in shape of the suction cup body drops the attractive force of the suction cup. Therefore, in order to prevent drop of the attractive force, a drawing up mechanism for compulsorily drawing up a central portion of the suction cup is demanded. On the other hand, where thermoplastic polyurethane elastomer is used for the suction cup body, the suction cup body suffers from less change in shape and also drop of the attractive force by secular change in shape is prevented. Consequently, such a drawing up mechanism for compulsorily drawing up a central portion of the suction cup as described above can be omitted. It is considered that this arises from the fact that, when heat is applied, an isocyanate group at a terminal of a molecule of the thermoplastic polyurethane elastomer and active hydrogen atoms of a hydroxyl group and an urethane group of an adjacent molecule react with each other to form a chemical crosslink which raises the heat resisting property and decreases the change in shape.

However, where styrene gel is used for the gel layer which forms the suction face, the convex and concave pattern of the surface of the dashboard is transferred to the suction face. As a result, it becomes liable to admit the air between the suction face and the attaching object face thereby to allow the suction cup to be removed from the attaching object face.

On the other hand, where polyurethane gel is used for the gel layer which forms the suction face, the concave and convex pattern of the surface of a dashboard or the like is not transferred to the suction face. Consequently, drop of the attractive force by secular change in shape is prevented.

It is considered that this arises from the fact that, since the urethane gel is a two-pack thermosetting material and forms a complete chemical crosslink after its hardening, physical properties thereof such as the heat resisting property, the compression set and so forth are improved significantly from those of existing gels by the chemical crosslink. It results in reduction of the change in shape also under such a high-temperature environment such as an environment wherein the suction cup is carried on a vehicle.

Therefore, the inventor has tried to obtain a suction cup which includes a suction cup body made of thermoplastic polyurethane elastomer and a gel layer made of polyurethane gel and can prevent drop of the attracting force by secular change in shape.

However, since the fusion strength between the suction cup body and the gel layer is very low, the gel layer is liable to be removed from the suction cup body, resulting in failure in commercialization. Therefore, further study has been continued.

Thus, it is desirable to provide a suction cup which can prevent drop of the attractive force thereof by secular change in shape or change. According to this embodiment, a suction cup which includes a suction cup body made of thermoplastic polyurethane elastomer and a gel layer made of polyurethane gel is provided with a countermeasure for assuring a high fusion strength between the suction cup body and the gel layer.

More particularly, according to this embodiment, there is provided a suction cup including a suction cup body and a gel layer. The suction cup body is made of a synthetic resin material having elasticity. The gel layer is bonded to the suction cup body and has a surface serving as a suction face. The suction cup body is made of thermoplastic polyurethane elastomer, and the gel layer is made of two-pack thermosetting polyurethane gel. The suction cup body and the gel layer are bonded to each other by bonding of an isocyanate group which the thermoplastic polyurethane elastomer has and a hydroxyl group which the two-pack thermosetting polyurethane gel has.

With the suction cup, since the disk cup body and the gel layer are bonded to each other with certainty, the gel layer is not removed from the disk cup body.

Further, since the suction cop body is made of thermoplastic polyurethane elastomer having a chemical crosslink structure, the suction cup body is less likely to suffer from change in shape and also drop of the attractive force by secular change in shape can be prevented.

Furthermore, since the gel layer is made of polyurethane gel, a concave and convex pattern of the surface of a dashboard or the like is not transferred to the gel layer, and drop of the attractive force by secular change in shape is prevented.

According to this embodiment, there is provided a fabrication method for a suction cup which includes a suction cup body made of thermoplastic polyurethane elastomer and a gel layer bonded to an attaching face of the suction cup body and made of two-pack thermosetting polyurethane gel and wherein the surface of the gel layer positioned remotely from the attaching face of the suction cup body serves as a suction face. The fabrication method includes the steps of molding a suction cup body made of thermoplastic polyurethane elastomer, which does not have a chemical crosslink and has a surplus isocyanate group, by injection molding. The fabrication method further includes the steps of placing the suction cup body on a female mold with the attaching face thereof directed upwardly, placing a male mold on the female mold to form a gel layer forming cavity of a shape corresponding to the gel layer between the attaching face and the male mold within a space between the male and female molds, injecting two-pack thermosetting polyurethane gel in a fluid state into the gel layer forming cavity to mold a gel layer on the attaching face. The fabrication method still further includes the steps of heating the thermoplastic polyurethane elastomer and the two-pack thermosetting polyurethane gel to thermally harden the thermoplastic polyurethane elastomer and the two-pack thermosetting polyurethane gel, and opening the male and female molds to obtain the suction cup.

With the fabrication method for a suction cup, since the heat treatment demanded for chemical crosslinking of thermoplastic polyurethane elastomer, the heat treatment demanded for chemical crosslinking of two-pack thermosetting polyurethane gel and the step of bonding the gel layer and the suction cup body can be carried out at the same step, the fabrication process can be shortened. This is advantageous where it is intended to enhance the productivity.

DETAILED DESCRIPTION OF THE PREFERRED EMBODIMENT

Figure 1:
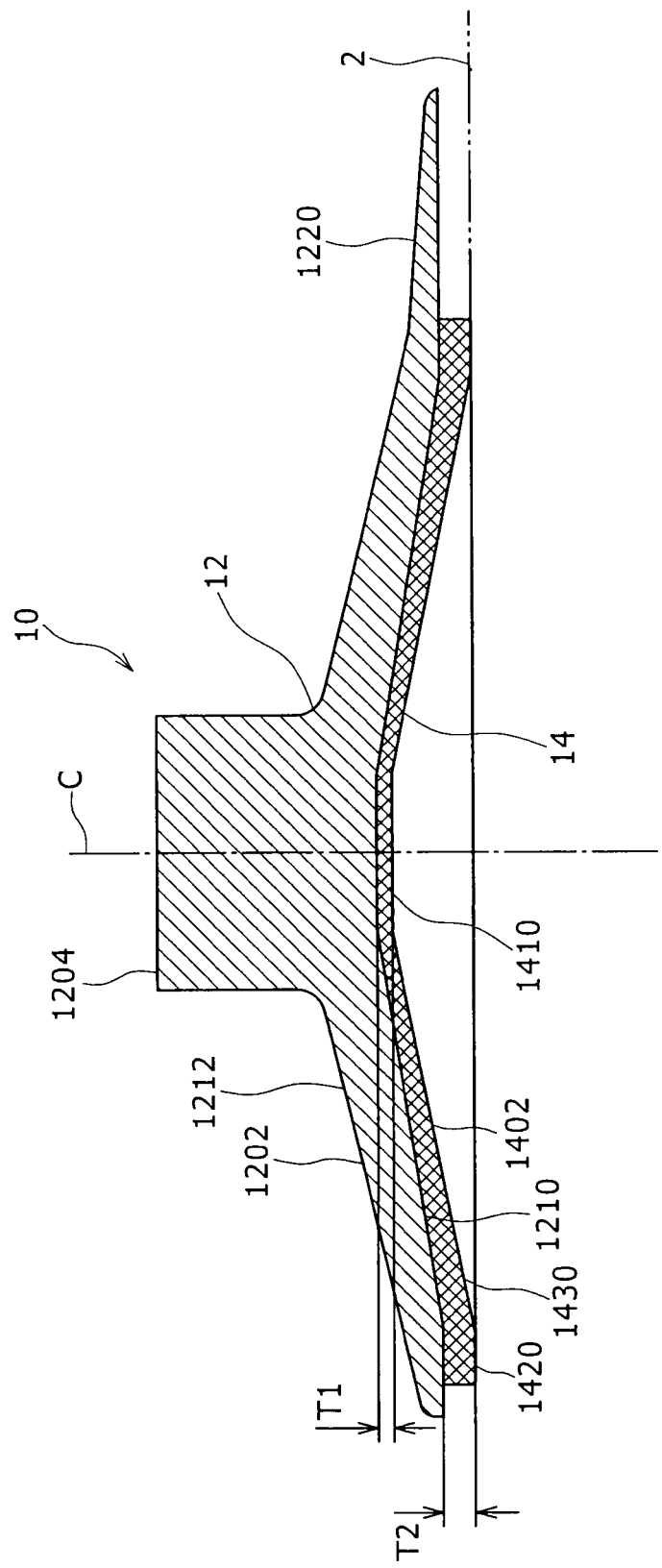
FIG. 1 is a front elevational sectional view showing a suction cup to which this embodiment is applied.

Referring first to FIG. 1, there is shown a suction cup 10 to which this embodiment is applied. The suction cup 10 includes a suction cup body 12 made of a synthetic resin material having elasticity, and a gel layer 14 bonded to the suction cup body 12.

The suction cup body 12 has a disk portion 1202 and a stem portion 1204 projecting from the center of the disk portion 1202. A center axis of the suction cup body 12 is denoted by reference character C. The disk portion 1202 has two faces, one of which is formed as a concave attaching face 1210 recessed at a central portion with respect an outer circumferential portion thereof and the other of which is formed as a concave back face 1212 which is convex at a central portion with respect to an outer circumferential portion thereof. The stem portion 1204 extends from the back face 1212. A piece portion 1220 for removing operation is provided on an outer edge of the disk portion 1202 such that it extends in a diametrically outward direction.

The gel layer 14 is bonded to the attaching face 1210 in such a manner as to cover the attaching face 1210. A suction face 1402 is formed from the surface of the gel layer 14.

As the synthetic resin material of the suction cup body 12, thermoplastic polyurethane elastomer having an isocyanate group or a surplus isocyanate group at a terminal of a molecule thereof is used. As such thermoplastic polyurethane elastomer, for example, "Miractran H585 GOBA" by Nippon Miractran Co. Ltd. which is an article on the market can be used. This thermoplastic polyurethane elastomer is manufactured so as to have an isocyanate group or a surplus isocyanate group at a terminal of a molecule thereof. It is to be noted that, also if a crosslinking agent having an isocyanate group is mixed in thermoplastic polyurethane elastomer which has no isocyanate group or no surplus isocyanate group at a terminal of a molecule thereof, thermoplastic polyurethane elastomer having an isocyanate group or a surplus isocyanate group at a terminal of a molecule thereof is obtained. Also this thermoplastic polyurethane elastomer can be used. For example, "LEZAMIN P-7282" by Dainichiseika Color & Chemicals Mfg. Co., Ltd. is one of such thermoplastic polyurethane elastomer which has no isocyanate group or no surplus isocyanate group at a terminal of a molecule thereof, and also a material produced by adding "Crossnate EM30" by Dainichiseika Color & Chemicals Mfg. Co., Ltd. as a crosslinking agent having an isocyanate group by 15 to 20% by weight to this product "LEZAMIN P-7282" can be used as the thermoplastic polyurethane elastomer.

Meanwhile, as the gel for forming the gel layer 14, two-pack polyurethane gel having a hydroxyl group at a terminal of a molecule thereof is used. Further, in this embodiment, the two-pack polyurethane gel is of the oil-free type in which plasticizer whose main component is oil is not mixed. The plasticizer here is material for softening, or reducing the hardness of, gel, and for example, paraffin-based oil or phthalate ester can be used as the two-pack polyurethane gel. As the two-pack polyurethane gel in which plasticizer whose main component is oil is not mixed, for example, "Nippolan ON-H05" by Nippon Polyurethane Industry Co., Ltd. can be used for the polyol and "Coronate HC-197" by Nippon Polyurethane Industry Co., Ltd. can be used for the isocyanate. By using such two-pack polyurethane gel in which plasticizer whose main component is oil is not mixed in this manner, such a disadvantage that, also under a high-temperature environment like an environment wherein the suction cup is carried on a vehicle, an oil component oozing out from the gel layer 14 leaves a scar on the surface of the dashboard or the like can be eliminated.

Further, on the attaching face 1210, the suction cup body 12 and the gel layer 14 are bonded to each other through bonding of an isocyanate group at a terminal of a molecule of the thermoplastic polyurethane elastomer and a hydroxyl group at a terminal of a molecule of the two-pack polyurethane gel. Consequently, the fusion strength of the suction cup body 12 and the gel layer 14 is raised. Accordingly, with the suction cup 10 of this embodiment, the following advantages are achieved. In particular, since the suction cup body 12 and the gel layer 14 are bonded to each other with certainty, the gel layer 14 is not exfoliated from the suction cup body 12. Since the suction cup body 12 is formed from thermoplastic polyurethane elastomer, the suction cup body 12 suffers little from change in shape. In other words, elastic force of drawing up a central portion of the suction face 1402 arising from the shape of the suction cup body 12 is maintained. Consequently, also drop of the attractive force by the secular change in shape is prevented, and accordingly, the drawing up mechanism for compulsorily drawing up a central portion of the suction cup 10 can be eliminated. Further, since the gel layer 14 is made of polyurethane gel, the concave and convex pattern of the surface of a dashboard or the like is not transferred to the suction face 1402, and consequently, drop of the attractive force by secular change is prevented. Accordingly, also under such a high-temperature environment like an environment wherein the suction cup is carried on a vehicle, the suction cup 10 exhibits high reliability. Further, since the suction cup body 12 is made of a thermoplastic material, it can be manufactured using an ordinary injection molding machine, and this is advantageous when it is tried to achieve reduction of the cost of the suction cup 10.

Now, a method of fabricating the suction cup 10 is described. The suction cup 10 according to this embodiment can be manufactured simply and with certainty by two-color molding described below. FIGS. 2A to 2D illustrate different steps of the fabrication process of the suction cup 10. First, the suction cup body 12 made of thermoplastic polyurethane elastomer is molded by injection molding. Although this suction cup body 12 has a determined shape, crosslinking by reaction of an isocyanate group and hydrogen atoms of a hydroxyl group and an urethane group of an adjacent molecule does not occur as yet, but the suction cup body 12 has an isocyanate group or a surplus isocyanate group at a terminal of a molecule thereof. In other words, a suction cup body 12 is produced which is made of thermoplastic polyurethane elastomer which has an isocyanate group or a surplus isocyanate group at a terminal of a molecule thereof and does not include a chemical crosslink.

Figure 2A:
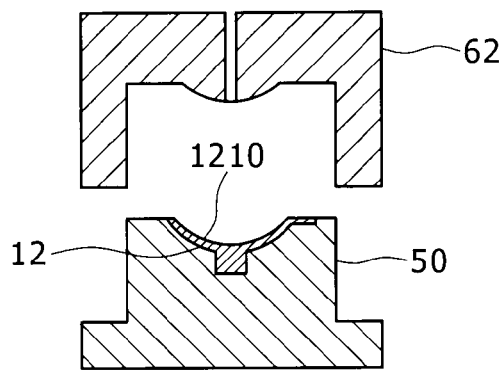
FIGS. 2A to 2D are schematic sectional views illustrating different steps of a fabrication process for the suction cup shown in FIG. 1.

Then, the suction cup 10 is placed on a female mold 50 with the attaching face 1210 thereof directed upwardly as seen in FIG. 2A. It is to be noted that the female mold 50 is kept in a state heated to approximately 80° C.

Figure 2B:
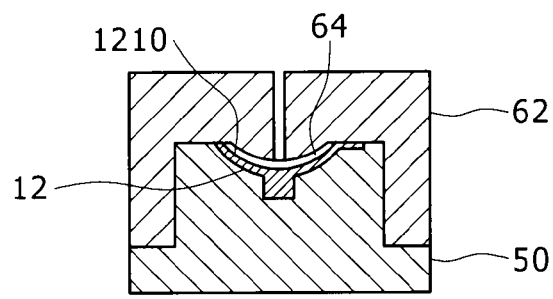
Figure 2C:
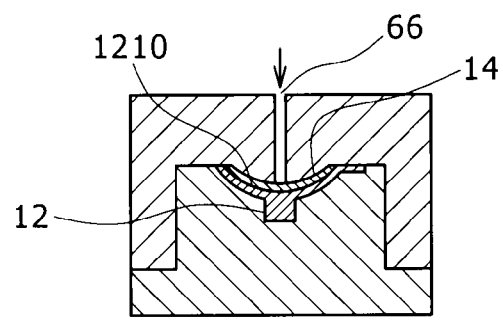

Then, a male mold 62 is placed on female mold 50 such that a gel layer molding cavity 64 of a shape corresponding to the gel layer 14 is formed between the attaching face 1210 and the male mold 62 in a space between the metal molds 50 and 62 as seen in FIG. 2B. It is to be noted that also the male mold 62 in this instance is kept in a state heated to approximately 80° C. Thereafter, two-pack thermosetting polyurethane gel in a fluid state is injected from an injection path 66 into the gel layer molding cavity 64 as seen in FIG. 2C to mold the gel layer 14 on the attaching face 1210. In this instance, the temperature of the two-pack thermosetting polyurethane gel to be injected is approximately 25° C. to 60° C.

Then, in a state wherein the female mold 50 and the male mold 62 are closed, the inside of the cavity 64 is kept heated to approximately 80° C. for approximately one hour. By this heat treatment, the following three reactions progress concurrently.

(1) An isocyanate group of a molecule and active hydrogen atoms of a hydroxyl group and an urethane group of an adjacent molecule of the thermosetting polyurethane elastomer react with each other to form a chemical crosslink. Then, by the chemical crosslink, the heat insulating property of the thermoplastic polyurethane elastomer enhances and the change in shape decreases.

(2) The two-pack thermosetting polyurethane gel is hardened and a complete chemical crosslink is formed after the hardening. By the chemical crosslink, physical properties of the two-pack thermosetting polyurethane gel such as the heat resisting property, the compression set and so forth are improved significantly.

(3) On the attaching face 1210, an isocyanate group which the thermoplastic polyurethane elastomer has and a hydroxyl group which the two-pack thermosetting polyurethane gel has are bonded to each other. By this bonding, the thermoplastic polyurethane elastomer and the two-pack thermosetting polyurethane gel are fusion bonded to each other with certainty thereby to achieve bonding of the suction cup body 12 and the gel layer 14 free from exfoliation.

Figure 2D:
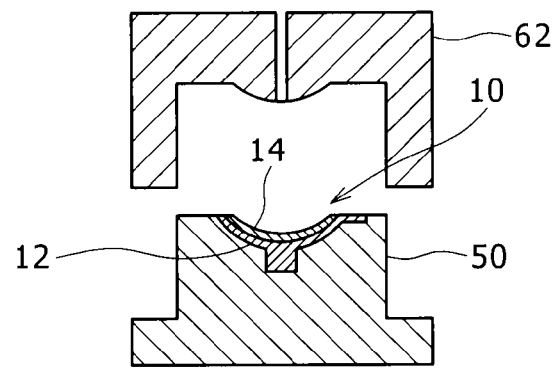

Then, the male mold 62 is opened as seen in FIG. 2D. Consequently, the suction cup 10 wherein the gel layer 14 and the suction cup body 12 are bonded to each other with certainty is obtained on the female mold 50. In the suction cup 10 obtained by such two-color molding as described above, the gel layer 14 is attached integrally to the attaching face 1210 of the suction cup body 12. Or in other words, the gel layer 14 is integrated with the attaching face 1210, and consequently, the gel layer 14 is not exfoliated from the attaching face 1210. Further, since the heat treatment demanded for chemical crosslinking of thermoplastic polyurethane elastomer, the heat treatment demanded for chemical crosslinking of two-pack thermosetting polyurethane gel and the of bonding the gel layer 14 and the suction cup body 12 can be carried out at the same step, the fabrication process can be shortened. This is advantageous where it is intended to enhance the productivity.

It is to be noted that, in this embodiment, the gel layer 14 does not have a uniform thickness but is configured such that the thickness of an outer circumferential portion 1420 of the gel layer 14 which forms an outer peripheral portion of the suction face 1402 is greater than the thickness of a central portion 1410 of the gel layer 14 which forms a central portion of the suction face 1402. More particularly, the central portion 1410 is formed with a uniform thickness T1, and the outer circumferential portion 1420 is formed with another uniform thickness T2 which is greater than the thickness T1 of the central portion 1410. Here, the uniform thickness in this instance is an almost uniform thickness including some dispersion originating from an error in molding or an error in accuracy and is a substantially uniform thickness. Furthermore, the central portion 1410 and the outer circumferential portion 1420 are connected to each other by an inclined portion 1430 in the form of an annular plate whose thickness gradually increases from the outer periphery of the central portion 1410 to the outer circumferential portion 1420. The central portion 1410 is formed with a thickness equal to that of the inner circumferential portion of the inclined portion 1430, and the outer circumferential portion 1420 is formed with a thickness substantially equal to that of the outer circumferential portion of the inclined portion 1430.

Where the thickness of the gel layer 14 is formed in this manner, even where an attaching object face 2 is formed as a leather-emboss face in the form of a fine concave and convex face or a rough face, the suction face 1402 is deformed following up the concave and convex shape. Consequently, the suction face 1402 can be contacted with the concave and convex face or rough face without leaving an air gap between the suction face 1402 and the concave and convex face. As a result, the suction cup 10 can be attached with certainty to the concave and convex face or rough face. Therefore, the suction cup 10 is advantageous in that it can attach such an article as a display unit with certainty to the attaching object face 2 such as a leather-emboss face of a dashboard or the like. Besides, the following advantages are achieved.

If the suction face 1402 is closely contacted with the attaching object face 2, then the gel layer 14 is extended by an increasing amount toward the outer circumference side thereof. Accordingly, the thickness of the gel layer 14 decreases toward the outer circumference, and as a result, the hardness of the gel layer 14 increases toward the outer circumference and the close contactness of the suction face 1402 with the attaching object face 2 drops. Meanwhile, where the suction cup 10 is used to attach such an article as a display unit to the attaching object face 2, if the gel layer 14 is formed with a great thickness of a uniform value in order to assure high close contactness, then the suction face 1402 of the suction cup 10 has an increased thickness, which deteriorates the appearance of the suction cup 10. Further, since an increased amount of gel is demanded, there is a disadvantage in achievement of reduction of the cost. In contrast, according to this embodiment, since the gel layer 14 of the central portion 1410 is formed such that it has a thickness which is greater at the outer circumferential portion 1420 than at the central portion 1410, where the suction face 1402 is closely contacted with the attaching object face 2, even if the gel layer 14 at the outer circumferential portion 1420 is extended by a greater amount than the gel layer 14 at the central portion 1410 and the thickness of the gel layer 14 gradually decreases, then the hardness of the gel layer 14 of the outer circumferential portion 1420 is kept at a low value. Thus, for example, the hardness of the gel layer 14 at the outer circumferential portion 1420 is kept at a substantially similar level to that at the central portion 1410. Therefore, by using a necessary but minimum amount of gel while the thickness of the suction cup 10 at the suction face 1402 is suppressed to a necessary but minimum level, the close contactness of the suction face 1402 with the attaching object face 2 can be assured. Accordingly, it is possible to assure the close contactness of the suction face 1402 while achieving reduction of the cost. Particularly in this embodiment, since the central portion 1410 and the outer circumferential portion 1420 are connected to each other by the inclined portion 1430 in the form of an annular plate whose thickness gradually increases toward the outer circumferential portion 1420, also reduction of the hardness of the gel layer 14 of the inclined portion 1430 is prevented efficiently. Accordingly, also drop of the close contactness of the gel layer 14 with the attaching object face 2 by the gel layer 14 is prevented. Therefore, the suction cup 10 is further advantageous in assurance of the close contactness of the suction face 1402 of the suction cup 10 with the attaching object face 2.

It is to be noted that variously known structures can be adopted for the configuration for attaching a vehicle-carried apparatus such as provision of a stem having rigidity for attaching a vehicle-carried apparatus on the suction cup body 12 of the suction cup 10 of this embodiment. Further, the suction cup 10 of this embodiment can be used in various methods and can be applied to various suction cup apparatus in related art of various known structures. For example, the suction cup 10 may be applied to a suction cup apparatus which has a drawing up mechanism for drawing up the central portion 1410 of the suction cup body 12. It is to be noted that, where the drawing up structure for drawing up the central portion 1410 of the suction cup body 12 is provided, since the central portion 1410 of the suction cup body 12 is drawn up compulsorily, the attaching face 1210 of the suction cup body 12 and the suction face 1402 of the gel layer 14 need not have a concave shape but may have a flat face. Or, where the attaching object face 2 has a concave shape or the like and the suction cup 10 is contacted closely with the attaching object face 2, if the suction face 1402 is formed so as to have a convex face along which the central portion 1410 projects from the central portion 1410, then since the central portion 1410 of the suction cup body 12 is compulsorily drawn up, the suction cup 10 can be attached to the concave attaching object face 2. Further, the article to be supported by the suction cup 10 is not limited to an electronic apparatus such as a vehicle-carried apparatus but may be various articles. Further, the attaching object face 2 to which the suction cup 10 is attached is not limited to a portion of a moving body such as a vehicle but may be a stationary portion irrespective of whether or not it is located indoors or outdoors.

It should be understood by those skilled in the art that various modifications, combinations, sub-combinations and alterations may occur depending on design demands and other factors insofar as they are within the scope of the appended claims or the equivalents thereof.

What is claimed is:

1. A suction cup, comprising:
    a suction cup body made of a synthetic resin material having elasticity; and
    a gel layer bonded to said suction cup body and having a surface serving as a suction face;
    said suction cup body being made of thermoplastic polyurethane elastomer,
    said gel layer being made of two-pack thermosetting polyurethane gel,
    said suction cup body and said gel layer being bonded to each other by bonding of an isocyanate group which the thermoplastic polyurethane elastomer has and a hydroxyl group which the two-pack thermosetting polyurethane gel has.

2. The suction cup according to claim 1, wherein the two-pack thermosetting polyurethane gel does not contain a plasticizer whose main component is oil.

3. The suction cup according to claim 1, wherein said gel layer has a thickness which is greater at an outer circumferential portion of said gel layer than at a central portion of said gel layer.

4. The suction cup according to claim 1, wherein said suction cup body has a concave attaching face which is concave at a central portion thereof with respect to an outer circumferential portion thereof, and said gel layer is bonded to said attaching face while said suction face has a concave shape.

* * * * *